United States Patent [19]
Gray et al.

[11] 3,838,748
[45] Oct. 1, 1974

[54] SAFETY SYSTEM FOR VEHICLES

[75] Inventors: Thomas A. Gray, Brea; Tyree R. Williams, Huntington Beach, both of Calif.

[73] Assignee: Ridersafe Systems, Inc., Placentia, Calif.

[22] Filed: Jan. 30, 1973

[21] Appl. No.: 328,030

[52] U.S. Cl............ 180/101, 307/10 SB, 317/141 S
[51] Int. Cl............................................ B60k 27/08
[58] Field of Search............ 180/82 C, 101, 102, 99; 307/10 SB, 10 R, 10 AT; 317/141 R, 141 S; 340/278, 52 E

[56] References Cited
UNITED STATES PATENTS

| | | |
|---|---|---|
| 3,186,508 | 6/1965 | Lamont............................ 307/10 R |
| 3,241,539 | 3/1966 | Kuehn............................ 317/141 S |
| 3,340,523 | 9/1967 | Whitman........................... 340/52 E |
| 3,500,946 | 3/1970 | Boyajian............................. 180/101 |
| 3,656,100 | 4/1972 | Beltrami........................ 307/10 AT |
| 3,680,539 | 8/1972 | Savage..................... 123/198 DC X |

*Primary Examiner*—Kenneth H. Betts
*Attorney, Agent, or Firm*—Knobbe, Martens, Olson, Hubbard & Bear

[57] ABSTRACT

A safety mechanism for protecting the driver of a vehicle by disabling the vehicle engine if the operator vacates his operator station on the vehicle, the mechanism including a manually operable override which disables the safety mechanism for a predetermined limited time period.

10 Claims, 1 Drawing Figure

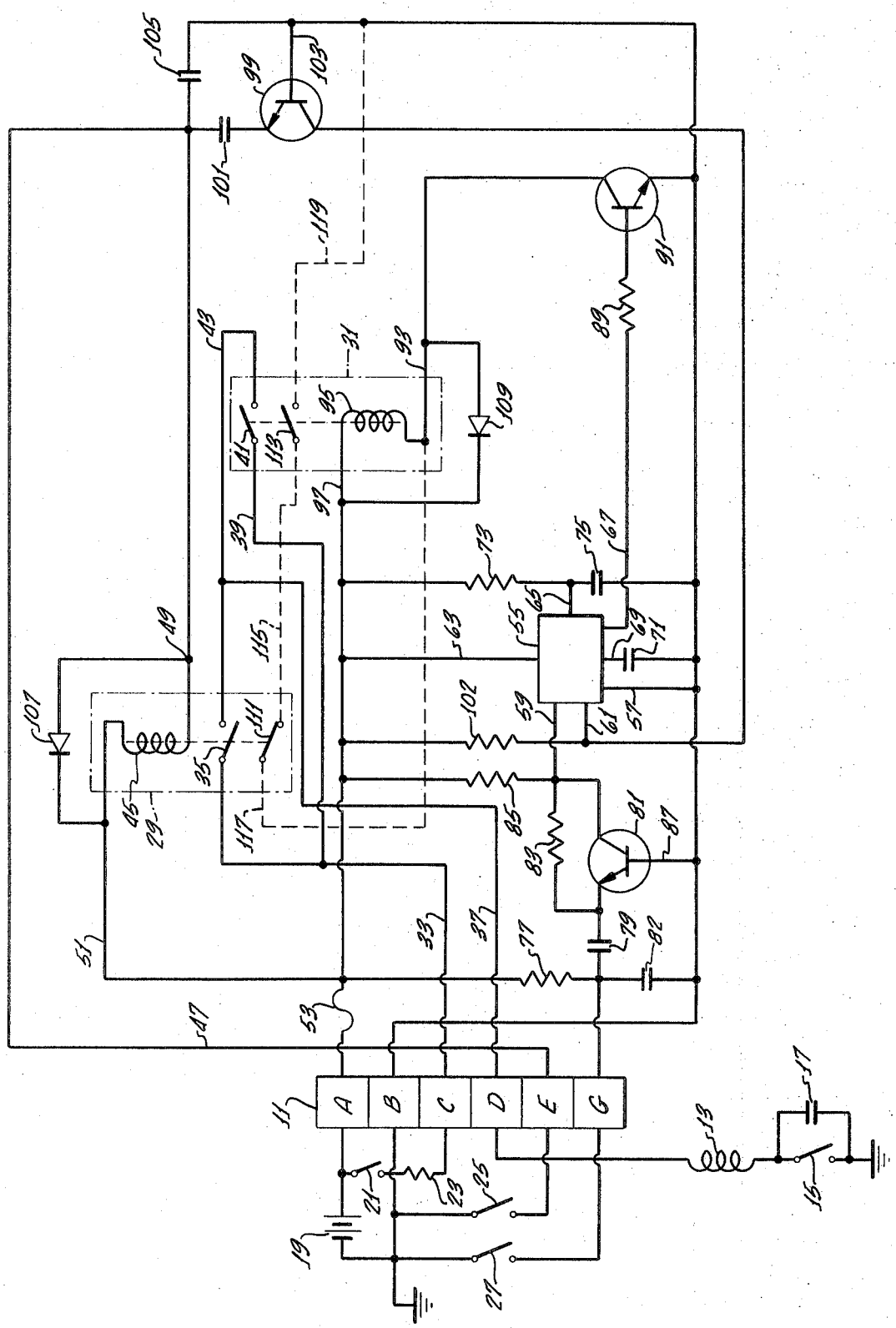

SAFETY SYSTEM FOR VEHICLES

BACKGROUND OF THE INVENTION

This invention relates to vehicle safety apparatus and more particularly to a safety mechanism for deenergizing a vehicle, such as a tractor or a forklift, in the event that the operator falls from the operator's station on the vehicle, so that the vehicle will not harm the operator or nearby personnel by continuing its forward motion without a driver.

While such safety mechanisms are common in the prior art, particularly in the form of a switch attached to an operator's seat which is in series with the primary ignition circuit of the vehicle, so that the operator must be seated for the vehicle engine to operate, the prior art systems have been plagued with certain problems which have substantially reduced their capability to assure operator safety. In many such systems it has been found that it is necessary to enable the operator to override the safety circuit so that the operator may vacate the operator's station for short periods of time, in order, for example, to attend to power take off equipment on a tractor or, in the case of a forklift, to adjust the vehicle load, etc. These override systems commonly include a switch, in parallel to the safety seat switch, which the operator may close to produce a secondary ignition path for the vehicle, thereby removing the seat switch from the ignition circuit. In such systems, however, it is possible for the operator to override the safety circuit and to forget to open the override switch after he has completed his task, so that a later fall of the operator from the vehicle may cause serious injury to the operator or surrounding personnel and equipment.

A second common failure of prior art devices has been the ability of the operator to override the safety circuit for the purpose of performing tasks away from the operator station, and to then leave the vehicle unattended for the performance of some other task, leaving the vehicle running for long periods of time and creating local polution problems within a warehouse, for example, which may present serious health problems to the operator and other personnel.

While some of the prior art devices have utilized short term time delays in the seat safety switch to assure that an operator, bouncing up and down upon the vehicle seat, will not deenergize the vehicle engine, none of the prior art circuits have solved the problems noted above.

SUMMARY OF THE INVENTION

The circuit of the present invention alleviates these and other problems of the prior art vehicle safety mechanisms by introducing a fixed time delay circuit into the safety mechanism which may be used for one of two alternate purposes. In the first embodiment, the time delay circuit operates in conjunction with the override switch so that when the operator actuates the override switch in order to enable the operator to leave the vehicle operator's station to perform tasks away from the vehicle, the operator is required to leave the vehicle within a predetermined time period after energizing the override switch. Thus, for example, the time delay circuit may be set for 10 seconds, so that once the operator of the vehicle energizes the override switch he must exit the vehicle within 10 seconds. If the operator changes his mind, for example, and decides to continue operating the vehicle rather than exiting the vehicle at the end of 10 seconds, the safety mechanism will be automatically activated once again and the override circuit will be removed from the mechanism operation so that, even if the operator forgets that he has actuated the override switch, he will be protected if he falls from the vehicle. Likewise, in this mode of operation, if the operator actuates the override switch and leaves the operator station and then returns to the operator station before the original time period has elasped, the activation of the switch sensing return of the operator to the operator station will reset the timing circuit so that the operator is immediately protected by the safety device.

In a second and alternate embodiment, the timing circuit is utilized to allow the operator of the vehicle a predetermined period of time in which to accomplish tasks remote from the vehicle. Thus, for example, the timing circuit may be set at 15 minutes to allow the operator of a forklift to adjust his load, while maintaining the vehicle engine running. If, however, the vehicle operator is delayed and the total time period which the timing circuit will allow elapses, the vehicle engine will be stopped. This mode of operation is particularly useful in the case of indoor vehicles, such as forklifts, in order to assure that the running vehicle is not left unattended for periods of time which may cause severe health problems due to polution of the local environment by the vehicle exhaust. As with the previous embodiment, the timing circuit in this second embodiment is designed so that the instant that the operator returns to his operator station, regardless of the state of the timing circuit, the timing circuit will be reset. Thus, the operator is immediately protected in case he falls from the vehicle. For example, if the timer is set so that the operator is allowed 15 minutes to accomplish a desired task, and if the operator leaves his operator station to do the task and returns after only 5 minutes, the timing circuit will be reset and the safety mechanism immediately enabled. Thus, even if the operator falls from his operator station or seat only seconds later, the vehicle engine will be stopped.

These and other advantages of the present invention are best understood by reference to the drawing, which shows a detailed schematic of the safety mechanism circuit of the present invention.

DETAILED DESCRIPTION OF THE PREFERRED EMBODIMENT

Referring to the drawing, the circuits of the present invention are connected to standard automobile ignition circuitry through a terminal strip or junction box 11. Thus, for example, terminal D is connected to the standard automobile ignition coil 13 which is in turn series connected to a parallel combination of the automobile points 15 and condenser 17 to ground. Likewise the automobile battery 19 is connected on one side to ground and on the other side to the terminal A of the terminal strip 11, in addition to being connected through the ignition switch 21 and standard balast resistor 23 to terminal C. In addition to these standard automotive components, two switches are connected through the terminal strip 11, and attached to the vehicle adjacent the operator station. A first switch 25 is connected between the grounded terminal B of the terminal strip 11 and terminal E thereof, and is placed on the vehicle to be closed when the operator is at the operator's station. The switch 25, in a typical example, may be attached to the operator's seat, so that when the operator is properly seated on the operator's seat the switch 25 is closed. A second switch 27 is connected between the grounded terminal B of the terminal strip 11 and terminal G thereof. The switch 27 is used as an override switch and is placed adjacent the operator's station on the vehicle to be manipulated manually by the operator when he desires to override the safety circuit.

The vehicle safety mechanism attached to the terminal strip 11 includes a pair of relays 29 and 31, each of which has the capacity of completing the ignition circuit for the vehicle. This ignition circuit may be completed by connecting the balast resistor 23 at terminal C of the terminal strip 11 to the ignition coil 13 at terminal D. Thus, terminal C is connected by means of a wire 33 to a switch 35 of the relay 29, which switch 35 is normally open and is capable of conducting ignition pulses through a wire 37 to terminal D of terminal strip 11. Similarly, the wire 33 is connected in turn to a wire 39 which is connected to a switch 41 of the relay 31, which switch 41 is normally open and, through a lead 43 and the lead 37, is capable of completing the ignition circuit to terminal D of the terminal strip 11.

The relay 29 includes a relay coil 45 which is responsive directly to the position of the operator station switch 25. Thus, when the switch 25 is closed, the terminal E of the terminal strip 11 is connected directly to ground, which in turn, through a wire 47, connects a terminal 49 at one end of the relay coil 45 to ground. The other end of the relay coil 45 is connected by means of a line 51 to the terminal A of terminal strip 11 through a fuse 53, the terminal A being in turn connected to the vehicle battery 19. Thus the relay 29 and its associated switch 35 is directly responsive to the position of the switch 25, so that whenever the vehicle operator is properly located in the vehicle operator's station, the switch 25 will be closed and the switch 35 will, in turn, be closed, connecting the terminals C and D of the terminal strip 11 to allow proper ignition of the vehicle.

The timing circuit of the present invention is designed around a central timing integrated circuit 55 which, in the preferred embodiment, is a Signetics Model NE555V circuit, which is connected to the circuit by means of a ground connection 57, a trigger input 59, a reset input 61, a power input 63, a threshold input 65 which may be connected to determine the time constant of the timing circuit 55, an output circuit 67 and a control voltage circuit 69 which is not used for this application, and which is therefore connected by a capacitor 71 to ground. The integrated circuit 55 has the function of responding to a negative input 12 at the trigger input terminal 59 to initiate the time period which is determined by the value of the resistor 73 and capacitor 75 connected to the threshold terminal 65. Prior to the initiation of the timing period by the integrated circuit 55, the output terminal 67 is at ground potential. When the integrated circuit is triggered at its input terminal 59, the output terminal 67 goes to a positive potential during the duration of the timing period. At the end of the timing period of the integrated circuit 55, or whenever the integrated circuit 55 is reset by a negative pulse on the reset terminal 61, the output terminal 67 again goes to ground potential until another timing sequence is initiated.

The integrated circuit 55 is designed to respond to an override switch 27 which, for example, may be a push button switch on the dashboard of the vehicle, in order to initiate the timing sequence. When the operator momentarily closes the switch 27, terminal G of the terminal strip 11 is momentarily grounded. Terminal G of the terminal strip 11 is normally held at the positive battery potential by means of a resistor 77 which is connected to the fuse 53. However, when the push button switch 27 is momentarily closed, the potential at terminal G of the terminal strip 11 will be clamped to ground, producing a negative pulse through a capacitor 79, which negative pulse will in turn be conducted through the emitter-collector junction of an isolation transistor 81 to the trigger input 59 of the integrated circuit 55. A capacitor 82 is connected across the switch 27 to eliminate spurious switching noise. A pair of resistors 83 and 85 are used to properly bias the isolation transistor 81, and the isolation transistor 81 is connected as a common base transistor with the base 87 connected to ground. The function of the isolation transistor 81 is to assure that any ringing which may be associated with the closing or opening of the switch 27 will not affect the operation of the integrated circuit 55, so that the integrated circuit 55 will operate only in response to closing of the switch 27. It will be recognized that opening of the switch 27, once it has been closed, will unclamp the terminal G of the terminal strip 11 from ground producing, a positive pulse through the capacitor 79 which will have no effect upon the input 59 of the integrated circuit 55, this input designed to respond to negative pulse inputs only.

When the output terminal 67 of the integrated circuit 55 is positive, that is, during the timing period of the integrated circuit 55, this positive potential is conducted through a resistor 89 to drive a switching transistor 91 to conduction, thereby connecting one terminal 93 of a relay coil 95 of the relay 31 to ground through the collector-emitter circuit of the transistor 91. When the terminal 93 of the relay coil 95 is connected to ground, the relay 31 will be energized, since the other terminal 97 of the relay coil 95 is connected through the fuse 53 and the terminal A of terminal strip 11 to the vehicle battery 19. Thus, whenever the integrated circuit 55 is in a timing sequence, the transistor 91 will be conductive and the relay 31 will be energized, so that the switch 41 will be closed producing an alternate ignition circuit between terminals C and D of the terminal strip 11.

The reset terminal 61 of the integrated circuit 55 is connected by means of an isolation transistor 99 and a capacitor 101 to the lead 47 which is connected to the vehicle operator seat 25 through terminal E of terminal strip 11. Whenever the operator returns to the vehicle station, closing the switch 25, the wire 47 will be clamped to ground potential. Whenever the switch 25 is open, on the other hand, the relay coil 45 of the relay 29 will conduct a positive potential from terminal A of terminal strip 11 so that the terminal 49 of the relay coil 45, and the wire 47 in turn, will be clamped to a positive potential. Thus, when the operator returns to the operator station closing the switch 25 the wire 47 will immediately undergo a potential change from the potential of the battery 19 to ground potential, producing a negative pulse through the capacitor 101 which is in turn conducted through the emitter-collector junction of the common base transistor 99 to the reset terminal 61 of the integrated circuit 55, resetting the integrated circuit 55 and placing the potential of the output terminal 67 of the integrated circuit 55 once again at ground potential. In the absence of such a negative pulse reset terminal 61 is maintained at a positive potential by a resistor 102. The isolation transistor 99 is used as a common base transistor with the base terminal 103 connected to ground and the base emitter circuit connected by a capacitor 105. A pair of diodes 107 and 109 are used to prohibit ringing due to field collapse in each of the relay coils 45 and 95 respectively.

An overall description of the primary operational mode of the preferred embodiment circuit may now be given. Initially, the operator closes the ignition switch 21, but until he is present at the vehicle operator station, the ignition circuit is not complete and the engine will not start. However, as soon as the operator is present at the operator station, thus closing the switch 25, current will flow through the relay coil 45 closing the switch 35 to complete the ignition circuit. If, at this point in time, the operator should accidentally fall from the operator station on the vehicle, the switch 25 will automatically open and the current through the relay coil 45 will therefore cease, opening the switch 35 and deactivating the ignition circuit between terminals C and D of the terminal strip 11. If the operator now momentarily closes the override switch 27, the integrated circuit 55 will be triggered by a negative pulse caused by the switch closing raising the output 67 of the integrated circuit 55 to a positive level to make the transistor 91 conductive so that the relay coil 95 is energized closing the switch 41. This produces an alternate ignition path between the terminals C and D of the terminal strip 11 through the switch 41, so that the ignition current may now flow through either switch 35 or switch 41. If the operator now departs the operator station, opening the switch 25, current through relay coil 45 will cease and the switch 35 will open. However, ignition will continue through the switch 41 so long as the integrated circuit 55 is in its timing sequence. As soon as the integrated circuit 55 times out, its output 67 will return to ground potential causing the transistor 91 to become nonconductive and thereby opening switch 41. Since switch 35 and switch 41 are now both open, ignition in the vehicle will cease and the engine will stop. In this mode of operation, the integrated circuit 55 may be adjusted by selecting the resistor 73 and the capacitor 75 to produce a timing sequence of approximately 10 or 15 minutes so that the vehicle operator will have 10 to 15 minutes to complete some task which he must perform removed from the operator's station. If he fails to return to the operator's station within the allotted time, the timing circuit 55 will deenergize the vehicle ignition circuit. It is an important additional feature of the present invention that if, during the timing sequence of the timing circuit 55, the operator should return to his operator's station, closing the switch 25, this switch closure will cause a negative impulse through the capacitor 101 and transistor 99 to trigger the reset terminal 61 of the integrated circuit 55, so that the output 67 of the integrated circuit 55 will immediately return to ground potential, opening the switch 41, so that the only ignition circuit is through the switch 35. Thus, regardless of the condition of the integrated circuit 55 when the operator returns to his operator's station and closes the switch 25, he is immediately protected, since the timing circuit 55 is reset. Thus, if the operator should fall from his vehicle station, the switch 35 will open and ignition will cease.

An alternate mode of operation of the present circuit is accomplished through the addition of a pair of switches 111 and 113 in the relays 29 and 31 respectively. The switch 111 is normally closed and the switch 113 is normally open. These switches are connected together by a wire 115 and the switch 111 is connected by a line 117 to the terminal 93 of the relay coil 95. The switch 113 is connected by a wire 119 to ground. In this mode of operation, the relay 31 becomes latched to produce an ignition circuit. The operation of this alternate circuit is as follows. Assume again that the operator is in the operator's station so that the switch 25 is closed, allowing ignition through the switch 35. In this mode of operation the integrated circuit 55 is set for a timing sequence of approximately 10 to 15 seconds. If the operator momentarily closes the switch 27, the integrated circuit 55 will begin its 10 to 15 second timing sequence, during which period the output 67 will be maintained at a positive potential maintaining the switch 41 closed, thus completing a secondary ignition circuit through the switch 41. If the operator fails to depart the operator station before the integrated circuit 55 has timed out, the output 67 of the integrated circuit 55 will return to ground potential, opening the switch 41, so that when the operator does finally leave the operator's station both the switch 41 and the switch 35 will be open and ignition will cease. If, however, the operator vacates the operator station during the timing period of the integrated circuit 55, his leaving the operator seat will open the switch 25 which will in turn deactivate the relay 29. Since the switch 111 is normally closed, the operator's vacation of his operator's station will close the switch 111 completing a circuit from the terminal 93 of the relay 95 through the switch 111 and the switch 113 to ground, latching the relay 31. When the integrated circuit 55 times out, the output 67 of the integrated circuit 55 will return to ground, thus making the transistor 91 nonconductive. However, since an alternate path has been produced through the switches 111 and 113 for current through the relay coil 95, the relay 31 will remain latched in its energized condition until the vehicle operator again returns to the operator station and closes the switch 25. Since the relay 31 is latched, the operator is free to utilize as much time as he desires before he returns to the operator station. When the operator now closes the switch 25, this will energize the relay 29, opening the switch 111 and unlatching the relay 31. The operator will, of course, now close the ignition circuit through the switch 35 so that the engine will continue to run. If the operator immediately falls from his operator station, opening of the switch 25 will open the switch 35, interrupting vehicle ignition. It will be seen that in either of the primary modes of operation the paramount attention has been given to operator safety so that regardless of the condition of the timing circuit 55 or its associated relay 31, as soon as the operator returns to his operator station and closes the switch 25, the timing circuit is reset so that the switch 25 may control the ignition circuit and the operator may thereby deenergize the ignition circuit by falling off the operator's station. This second mode of operation protects the operator even if he closes the switch 27 and then changes his mind about leaving the vehicle. As soon as the 10–15 second time delay has elapsed he will again be protected by the safety mechanism.

It should also be noted that the override switch 27 may, as explained above, be a push button switch on the vehicle dashboard. However, in either of the modes described, it may be desirable to place the switch 27 adjacent the vehicle parking brake so that the switch 27 is closed whenever the parking brake is engaged.

What is claimed is:

1. A safety mechanism for the protection of the operator of a vehicle having an operator station, comprising:
    means responsive to departure of said operator from said operator station for deenergizing said vehicle when said operator vacates said operator station;
    manually operable override means for preventing operation of said deenergizing means for a predetermined, limited time period; and
    means for automatically resetting said override means whenever said operator returns to said operator station to allow immediate operation of said deenergizing means.

2. A safety mechanism as defined in claim 1 wherein said operator station is an operator's seat, and wherein said deenergizing means comprises a switch mounted on said operator's seat and responsive to the weight of the operator on said seat.

3. A safety mechanism for the protection of the operator of a vehicle having an operator station, comprising:
    means responsive to the departure of said operator from said operator station for deenergizing said vehicle when said operator vacates said vehicle; and
    manually operable override means for preventing operation of said deenergizing means for a first time period if said operator vacates said operator station within a predetermined second time period after manual operation of said override means.

4. A safety mechanism as defined in claim 3 additionally comprising:
    means for automatically resetting said override means when said operator returns to said operator station, thereby allowing immediate operation of said deenergizing means.

5. A safety mechanism as defined in claim 3 wherein said operator station is an operator's seat, and wherein said deenergizing means comprises a switch mounted on said operator's seat and responsive to the weight of the operator on said seat.

6. A safety mechanism as defined in claim 3 wherein said deenergizing means and said overrride means each include a relay, the relay of said override means being latched to an energized condition in response to energization of said override means relay and deenergization of said deenergizing means relay.

7. A safety mechanism for the protection of the operator of a vehicle having an operator station and primary ignition circuit comprising:
    means for sensing the departure of said operator from said operator station;
    first switch means connected to said ignition circuit for selectively enabling or disabling said ignition circuit, said first switch means operating in response to said sensing means;
    a manually operable switch;
    timing means, responsive to said manually operable switch for initiating a predetermined delay period;
    second switch means responsive to said timing means and connected to said ignition circuit for selectively enabling or disabling said ignition circuit.

8. A safety mechanism as defined in claim 7 wherein said second switch means latches to a position for enabling said ignition circuit when said second switch means is positioned to enable said ignition circuit and said first switch means is positioned to disable said ignition circuit.

9. A safety mechanism as defined in claim 7 wherein said second switch means disables said ignition circuit when said first switch means is positioned to disable said ignition circuit and said predetermined delay period ends.

10. A safety mechanism as defined in claim 7 additionally comprising:
    means for positioning said second switch means to disable said ignition circuit whenever the operator returns to said operator station.

* * * * *